(12) United States Patent
Mohan

(10) Patent No.: US 7,523,082 B2
(45) Date of Patent: Apr. 21, 2009

(54) ESCALATING ONLINE EXPERT HELP

(76) Inventor: Prabhuram Mohan, 1530 Prosperity Ct., San Jose, CA (US) 95131

( * ) Notice: Subject to any disclaimer, the term of this patent is extended or adjusted under 35 U.S.C. 154(b) by 169 days.

(21) Appl. No.: 11/429,774

(22) Filed: May 8, 2006

(65) Prior Publication Data

US 2007/0260587 A1 Nov. 8, 2007

(51) Int. Cl.
*G06N 5/00* (2006.01)
(52) U.S. Cl. .................. 706/45; 706/47
(58) Field of Classification Search .......... 706/465, 706/45; 705/8; 370/438
See application file for complete search history.

(56) References Cited

U.S. PATENT DOCUMENTS

| | | | |
|---|---|---|---|
| 3,937,892 A * | 2/1976 | Bloch et al. ............ | 370/438 |
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,691,159 B1 | 2/2004 | Grewal et al. | |
| 6,732,156 B2 | 5/2004 | Miloslavsky | |
| 6,829,585 B1 * | 12/2004 | Grewal et al. .............. | 705/8 |
| 6,865,540 B1 | 3/2005 | Faber et al. | |
| 2001/0034727 A1 | 10/2001 | Ciurcina | |
| 2002/0059164 A1 | 5/2002 | Shtivelman | |
| 2003/0023686 A1 | 1/2003 | Beams et al. | |

FOREIGN PATENT DOCUMENTS

WO  WO 01/35272 A2  5/2001
WO  WO 2004/040396 A2  5/2004

OTHER PUBLICATIONS

"Comprehensive, enterprise-wide, web-based help-desk and customer support software" (Badger Network Technology Ltd. Helpline found at www.BadgerNT.co.uk/helpline.shtm on Oct. 26, 2006).
"Hey Math!" (AskATeacher Helpline found at www.heymmath.net.index.jsp on Oct. 26, 2006).

* cited by examiner

*Primary Examiner*—Wilbert L Starks, Jr.

(57) ABSTRACT

A method and apparatus for providing a human expert to answer a question from an agent in real time. The method includes the steps of identifying a plurality of human experts based upon a subject matter of the question, determining an availability of at least some of the plurality of identified experts and selecting an expert of the plurality of experts to answer the question in real-time based upon the subject matter and availability of the selected expert.

27 Claims, 1 Drawing Sheet

ESCALATING ONLINE EXPERT HELP

FIELD OF THE INVENTION

The invention relates to information retrieval systems and more particularly to methods of accessing expert help.

BACKGROUND OF THE INVENTION

Methods of searching for information within data networks are generally known. In the case of the Internet, one or more websites may be provided that function as search engines to help users locate information.

In order to use a search engine, a user accesses a website (e.g., Google) and enters one or more search terms. The search engine by reference to an internal memory may retrieve and present the Internet addresses of one more web locations that have information related to the search terms.

Upon receiving the web addresses, the user may go to the web locations and review and/or download the information. If the user does not find the desired information, he may go back to the search engine and start over. In the course of a search, a person seeking information may visit many websites and spend a considerable amount of time reviewing information that may be of limited relevance to the person's question.

In the context of an organization, the world wide web may be supplemented with an internal database that provides a directory of websites that may have more relevant information. Alternatively, the organization may create its own database of information for use by its members and agents as a means of helping those members and agents make decisions on behalf of the organization. While databases of this type are helpful, they often require constant modification to adapt the content to the changing needs of the organization.

In addition, databases often requires training to allow users to effectively utilize the database. For these and other reasons, a need exists for a better method of providing information to agents of organizations.

SUMMARY

A method and apparatus are provided for identifying a human expert to answer a question from an agent in real time. The method includes the steps of identifying a plurality of human experts based upon a subject matter of the question, determining an availability of at least some of the plurality of identified experts and selecting an expert of the plurality of experts to answer the question in real-time based upon the knowledge and availability of the selected expert.

DETAILED DESCRIPTION OF AN ILLUSTRATED EMBODIMENT

In general, many organizations operate based upon a collective set of theories and objectives that are constantly changing based upon the type of organization involved, the objectives of the organization and the environment within which the organization exists. Often the dynamic nature of organizational objectives prevents the development of any cohesive body of searchable information. Within such an environment, operational decisions require the constant input of a number of experts who are knowledgeable about the current state of the organization.

Figure 1:
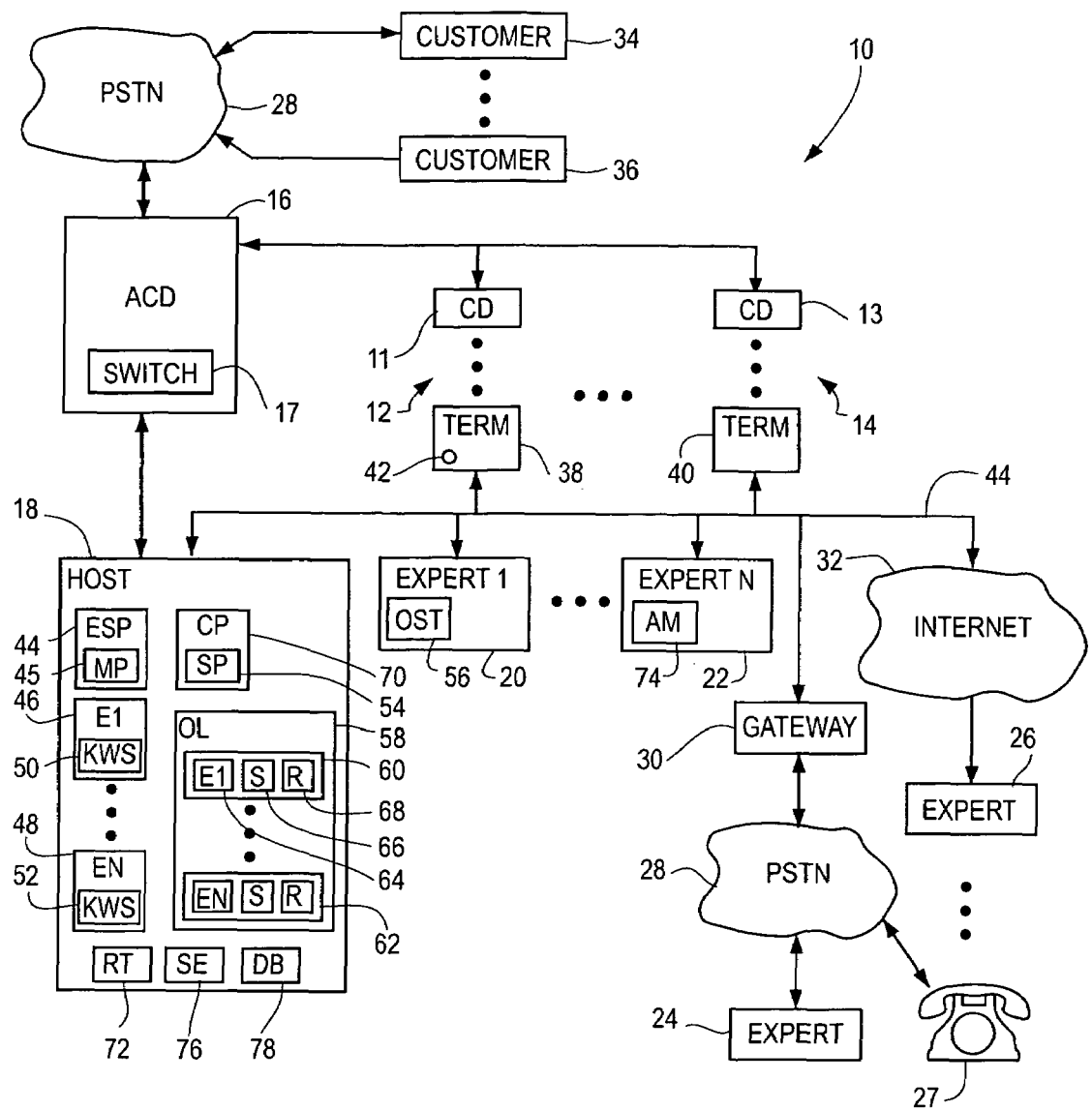
FIG. 1 is a block diagram of a communication system for expert selection in accordance with an illustrated embodiment of the invention.

FIG. 1 is a block diagram in accordance with an illustrated embodiment of the invention of a system 10 that may be used by an organization (e.g., a merchant) for locating an expert for a particular question shown generally. In general, the organization that uses the system 10 may include a number of agents 12, 14 who interact with clients (e.g., customers) 34, 36 of the organization. In the case of a merchant, the agents 12, 14 may interact with the customers 34, 36 for purposes of selling a product of the merchant, for providing product information, for resolving warranty issues or for providing customer service.

From time to time, an agent 12, 14 may need to interact with an expert 20, 22, 24, 26 of the organization. For example, if the organization were to sell computers and a customer 34, 36 were to need technical information, then the agent 12, 14 may need to interact with a designer of the computer to answer the specific question posed by a customer 34, 36. In accordance with illustrated embodiments of the invention, a host 18 is provided that determines the type of question involved, selects an expert to provide an answer to the question and makes the expert available to the agent.

In general, agents 12, 14 may interact with customers 34, 36 under any of a number of different modes of customer contact. Under one embodiment, the agents 12, 14 may interact with customers 34, 36 through a telephone connection that may involve the Public Switched Telephone Network (PSTN) 28 and an automatic call distributor (ACD) 16. Alternatively, agents 12, 14 may interact with customers 34, 36 in a face-to-face context. As a still further alternative, interaction between agents 12, 14 and customers 34, 36 may be through the Internet.

Turning specifically now to FIG. 1, it should be understood that the boxes labeled 12 and 14 represent an agent station 12, 14. (The reader should note that sometimes for convenience, the reference number of the agent station 12, 14 will be used to refer to the agent.) Included within each agent station 12,14 may be a communication device (e.g., a telephone 11, 13) and a computer terminal 38, 40.

It should also be understood that the boxes labeled 20, 22, 24, 26 represent a communication device used by an expert. Again, the reference number of the communication device 20, 22, 24, 26 may sometimes be used to refer to the expert who uses the communication device.

As the agents (e.g., agent 12) converses with a customer (e.g., customer 34), the customer 34 may pose a question that the agent 12 cannot answer. In order to obtain an answer to the question, the agent 12 may activate an expert help softkey 42 of his terminal 38 as a request for expert help.

Figure 2:
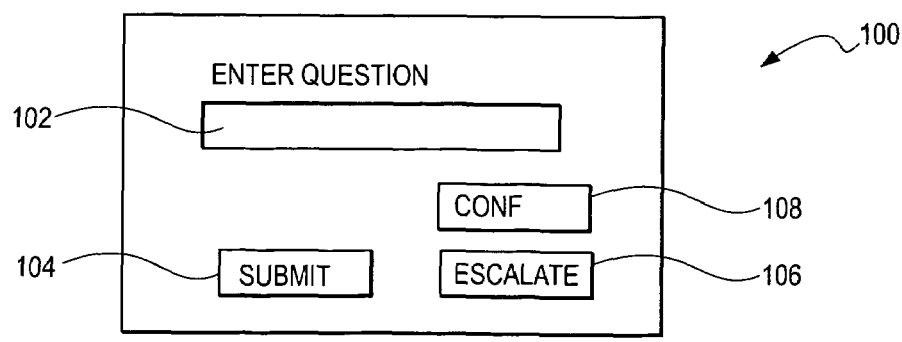
FIG. 2 is a query screen that may be used within the system of FIG. 1.

Activating the expert help softkey 42 causes the terminal 38 to display a help request window 100 (FIG. 2). Within the help request window 100 may be a subject matter window 102 and a SUBMIT softkey 104. The agent 12 may enter a question (or simply keywords related to the question) into the subject matter window 102 and activate the SUBMIT softkey 104.

In other embodiments, the agent 12 may dial a telephone number associated with expert help. An autoattendant within the host 18 may answer the call and provide one or more options for the agent 12 to select as a means of identifying a subject matter of the call.

Upon activation of the SUBMIT softkey 104 (or activation of a submit request in the case of the autoattendent), a query file containing the question (or keywords) is sent to a search engine 76 within the host 18. The search engine 76 searches a database 78 and returns any related articles and materials to the agent 12.

If the agent 12 is not satisfied with the materials returned by the search engine 76, then the agent 12 may activate an ESCALATE softkey 106. Upon activation of the ESCALATE softkey 104, the query file containing the question (or keywords) is sent to an expert selection processor 44 within the host 18. Within the expert selection processor 44, the keywords entered through the interactive window 102 may be used by a matching processor 45 as search terms for use with a set of expert files 46, 48. Within each of the expert files 46, 48 may be a set of keywords 50, 52 or other descriptive information that relates to the expertise of each of the experts 20, 22, 24, 26.

The expert files 46, 48 may be generated as part of a separate process or may be based upon an existing database. For example, the expert files 46, 48 could be an enhanced set of human resource (HR) files maintained as part of each expert's service record with the organization. In this case, copies of any prior articles written by the expert as well as a synopsis of past and present work history, education and experience may be included in the HR files and used as a basis for the expert files 46, 48.

The matching processor 45 compares the question or keywords entered by the querying agent 12 with the keywords within each of the expert files 46, 48 to determine a type of question involved and the relative match between the question or keywords from the agent and the keywords or descriptive material within the expert files 46, 48. the matching processor 45 may transfer identifiers any identified matching files (and the degree of matching) to the expert selection processor 44.

The expert selection processor 44 may form an ordered list 58 of experts 20, 22, 24, 26 based upon the extent to which the question or keywords provided by the agent 12, 14 matches the keywords or other descriptive information within the expert files 46, 48. The ordered list 58 may include a file 60, 62 for each expert 20, 22, 24, 26 within the ordered list. The file 60, 62 may include an identifier 64 of the expert, a status 66 (i.e., available or unavailable) of the expert and a ranking 68. The ranking 68 may be based upon a percentage match between the question from the agent 12 and the keywords or other descriptive information within the expert files 46, 48. From the ordered list, the expert selection processor 44 selects an expert 20, 22, 24, 26.

In order to select an expert 20, 22, 24, 26, the expert selection processor 44 may transfer the ordered list to an availability processor 56 that first determines an availability of the experts 20, 22, 24, 26 within the ordered list. Availability may be determined based upon any of a number of different methods. Under a first method, the availability processor 56 may send a query to an OUTLOOK scheduling tool 56 within a terminal of each expert 20, 22, 24, 26 within the ordered list. The query determines whether the respective experts 20, 22, 24, 26 have scheduled themselves to be available at a current time to answer questions of the type submitted by the agent 12.

Under the illustrated embodiment, the experts 20, 22, 24, 26 may activate a scheduling tool 56 (e.g., OUTLOOK, lotus notes, Sun Office, etc.) within a terminal (e.g., terminal 20) and create an availability schedule for a time period. The availability schedule may indicate that the expert is available for any type of question or the schedule may be divided up by type of question and time period.

Upon accessing the scheduling tool 56 of each expert of the ordered list, the availability processor 56 may compare a current time with a time entered by the expert 20, 22, 24, 26 into the scheduling tool 56 as a basis for determining that the expert is available for this type of question. If the current time falls within the availability time entered by the expert 20, 22, 24, 26, then the expert is classified as available. If the current time falls outside of the scheduled availability time, then the expert is classified as not available.

The scheduling tool 56 provides the experts with the ability to answer questions during scheduled time periods and to not answer questions outside of the scheduled time periods. Other means of identifying the current availability may be provided for prioritized situations. In effect, the scheduling tool 56 allocates timeslots for answering questions and also to block slots where the experts is not available for answering questions.

The status of each of the experts 20, 22, 24, 26 identified within the ordered list (i.e., whether the expert is classified as available or unavailable) is determined and returned to the expert selection processor 44 as an additional parameter to be entered into a status field 66 of the ordered list.

Upon determination of status of each expert 20, 22, 24, 26 within the ordered list 58, the expert selection processor 44 may present the ordered list 58 in real time to the agent for selection or may automatically select an expert and connect the expert to the agent 12 posing the question in real time (e.g., within a few seconds after posing the question). Where the selection is made by the agent 12, 14, the ordered list 58 may be presented on the terminal 38, 40 of the agent 12, 14.

The ordered list 58 may be provided with a list of qualifications and, possibly, with contact information. The agent 12, 14 may select an expert 20, 22, 24, 26 and the system 10 may automatically connect the agent 12, 14 and expert 20, 22, 24, 26. Alternatively, the agent 12, 14 may use the contact information to contact the expert directly.

Alternatively, the selection may also be made automatically by the agent selection processor 44. In order to select an expert, the expert selection processor 44 may select the expert with a highest relative ranking within the ranking field 68 of the ordered list 58. If the expert with the highest relative ranking 68 is listed as being unavailable within the status field 66, then the expert selection processor 44 may select the expert with the next highest ranking within the ordered list 58 and so on until an available expert (e.g., expert 22) is selected.

Once an expert 22 is selected, then the selected expert is connected to the agent 12. Connection may be accomplished under any of a number of real-time formats. For example, the host 18 may transfer a communication system identifier (e.g., a telephone number of a telephone 27 of an expert to the ACD 16. The ACD 16 may initiate an outbound call to the expert 27. When the expert 27 answers, a switch 17 within the ACD 16 may connect the expert 27 to the querying agent 12.

Alternatively, the expert selection processor 44 may transfer an IP address of the selected expert 22 and querying agent 12 to a communication processor 70. The communication processor 70 may set up a voice connection under a Voice over Internet Protocol (VoIP) protocol between the querying agent 12 and selected expert 22. Alternatively, the communication processor 70 may set up a chat session under a text format between the querying agent 12 and selected expert 22.

In the case where the contact with the customer 34, 36, is through the PSTN 28, the agent 12, 14 may conference the expert 20, 22, 24, 26 into the call with the customer 34, 36. In this case, the agent 12, 14 may activate a CONFERENCE softkey 108 after activation of the escalate pushbutton 106.

Under another illustrated embodiment, expert selection may be escalated based upon a ranking threshold 72 and availability. For example, if no experts can be found or the expert selected during a first selection stage has a ranking below the ranking threshold 72 (e.g., 50%), then the expert selection processor 44 may attempt to select an expert with a higher ranking as part of a second, escalated selection stage.

In the second, escalated selection stage, the expert selection processor 44 may determine availability through other methods. In the second, escalated selection stage, availability may be determined by the activity of the expert, but not in a conventional sense. For example, in a conventional sense, an activity may mean that a person is preoccupied with a first activity and cannot or will not engage in a second activity. As used herein, the detection of at least some first activities means that the expert is available for a second activity and will preferentially terminate the first activity in favor of the second activity. For example, the detection of an expert working at his computer as a first activity means that the expert with preferentially terminate that first activity during the escalated selection stage in favor of the second activity of answering a query from an agent 12. Alternatively, the detection of an expert engaged in the first activity of talking on a telephone with another party is taken as an indicator that the expert will preferentially terminate that first call to engage in the second activity of answering queries from agents.

This is clearly different than the situation where a caller places a call to a call recipient and detects a busy signal. In this case, the busy signal does not indicate availability and, instead, indicates a lack of availability. The difference, of course, is that under illustrated embodiments of the invention, the detection of availability is part of a two-step process where the first step is detecting the location of the expert and the second step is that the expert as consideration for being part of the organization has a priori agreed to terminate other activities in favor of answering queries from agents 12, 14.

Detection of activity of an expert 20, 22, 24, 26 may be accomplished under any of a number of different formats. Under a first format, an activity monitoring processor 74 is placed within a computer of each expert working on the system 44. Any activity on the part of the expert within the computer (e.g., typing, modifying files, Internet access, etc.) causes the activity monitor 74 to correlate the activity with the presence of the expert. A search processor 54 within the communication processor 70 may poll the activity monitors 74 of the experts to detect the presence of the respective experts.

Under other formats, the search processor 54 within the communication processor 70 may place a telephone call to an expert (e.g., 24) through a gateway 30 and PSTN 28 to the cellphone 24 of the expert. The detection of a busy signal indicates the presence of the expert 24. Similarly, by monitoring a buddy list (e.g., available through AOL, etc.), the search processor 54 may detect the presence of another expert (e.g., 26) through the Internet 32.

Under the second escalated selection stage, the expert selection processor 44 may retrieve communication system address identifiers (e.g., Internet address, telephone numbers, etc.) from the expert files 46, 48 and transfer the address identifiers to the search processor 54. The search processor 54, in turn, may sequentially determine a presence of each expert 20, 22, 24, 26 using a predetermined process. For example, the search processor 54 may first query the activity monitor 74 to detect activity on a computer of the expert. Next, the search processor may search a buddy list for the presence of the expert on-line. Finally, the search processor 54 may place a telephone call to known telephone numbers of the expert.

In any case, upon detecting the presence of an expert, the search processor 54 may return a communication system address to the expert selection processor 44 identifying where the expert has been located. In response, the expert selection processor 44 may select the highest ranked expert in the ordered list 58 and proceed to set up a real-time connection between the querying agent 12 and selected expert as described above. In order to notify the expert about the query and to allow the expert to terminate any prior activity, the expert selection processor 44 may send a notification (e.g., an instant message) to the selected expert. In the case of a cellphone 24, the instant message may appear on a display on the cellphone (not shown) or a personal digital assistant (PDA) of the expert. In the case of computers 20, 22, 26, the instant message may be displayed conventionally.

In another illustrated embodiment, the process of escalating expert selection lies in the priority of the customer. In this case, it may be necessary to expedite expert selection and set up of the communication channel by preempting the expert from his other activities regardless of his availability with the reasonable assumption/detection that the system 10 can reach the expert. In this regard, if the customer is a new customer simply needing addition detailed information about a product, then the call may not be of a sufficiently high priority. However, if the customer is going to place a large order based upon the answer to his question or if this customer is a premier customer, then the system 10 may preempt the expert's current activity so that the question takes priority.

The priority of the question may be determined based upon any of a number of different methods. Under a first method, a set of softkeys labeled "HIGH", "MEDIUM" and "LOW" maybe be provided on the screen 100 where the agent may enter his evaluation of the priority. Alternatively, a priority processor within the host 18 may identify the customer by accessing a call file created by the ACD during call set up. By accessing the call file, the priority processor may identify the customer and determine a priority of the question based upon the identity of the customer.

Once the expert has terminated has prior activity, the host 18 may set up a voice connection between the selected expert and agent. Once connected, the expert and agent can confer as necessary to resolve the question posed by the agent.

In another embodiment, the question may be presented on a terminal of the expert at the same time as call set up occurs. Presentation of the question in advance of the call connection saves time by allowing the expert to consider the question in advance of the conversation.

A specific embodiment of method and apparatus for identifying a human expert has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of providing a human expert to answer a question from an agent interacting with a customer in real time comprising:

receiving the question from the customer to the agent;

submitting the question to a search engine and the agent receiving information retrieved by the search engine based upon the question;

activating a second search to indentify in real-time a plurality of human experts best suited to answer the question based upon a subject matter of the question in response to the agent determining that the information retrieved is not sufficient to answer the question;
determining an availability of at least some of the plurality of identified experts; and
selecting an expert of the plurality of experts to answer the question in real-time based upon the subject matter and availability of the selected expert.

2. The method of providing the expert as in claim 1 wherein the step of selecting an expert further comprises connecting the selected expert and the agent.

3. The method of providing the expert as in claim 2 further comprising connecting the selected expert and agent via telephone.

4. The method of providing the expert as in claim 2 further comprising connecting the selected expert and the agent via a chat session.

5. The method of providing the expert as in claim 1 further comprising ordering the plurality of experts from best relative match to worst relative match based upon the matching of the question with the keyword list of each expert of the plurality of experts.

6. The method of providing the expert as in claim 1 wherein the step of determining an availability of each of the plurality of experts further comprises accessing an availability time schedule for each expert of the plurality of experts.

7. The method of providing the expert as in claim 1 wherein the availability time schedule further comprises a scheduling tool.

8. The method of providing the expert as in claim 1 wherein the step of determining an availability further comprises detecting a current activity of a currently occupied expert of the ordered plurality of experts, determining whether the current activity is a current activity that can be preempted, and preempting the current activity by terminating the current activity in favor of answering the question in response to determining that the current activity can be preempted.

9. The method of providing the expert as in claim 8 further comprising preempting the current activity of an expert of the plurality of experts based upon a priority of the call.

10. The method of providing the expert as in claim 9 wherein the preempted activity further comprises the expert using a computer.

11. The method of providing the expert as in claim 9 wherein the preempted activity further comprises the expert using a telephone.

12. An apparatus for providing a human expert to answer a question from an agent interacting with a customer in real time comprising:
    means for receiving the question from the customer to the agent;
    means for submitting the question to a search engine and for returning to the agent information retrieved by the search engine based upon the question;
    means for activating a second search to identify in real-time a plurality of human experts best suited to answer the question based upon a subject matter of the question in response to the agent determining that the information retrieved is not sufficient to answer the question;
    means for determining an availability of at least some of the plurality of identified experts; and
    means for selecting an expert of the plurality of experts to answer the question in real-time based upon the subject matter and availability of the selected expert.

13. The apparatus for providing the expert as in claim 12 wherein the means for selecting further comprises means for connecting the selected expert and the agent.

14. The apparatus for providing the expert as in claim 13 wherein the means for connecting further comprises a telephone.

15. The apparatus for providing the expert as in claim 13 wherein the means for connecting further comprises a chat session.

16. The apparatus for providing the expert as in claim 12 further comprising means for ordering the plurality of experts from best relative match to worst relative match based upon the matching of the question with the keyword list of each expert of the plurality of experts.

17. The apparatus for providing the expert as in claim 12 wherein the means for determining an availability of each of the plurality of experts further comprises means for accessing an availability time schedule for each expert of the plurality of experts.

18. The apparatus for providing the expert as in claim 12 wherein the availability time schedule further comprises a scheduling tool.

19. The apparatus for providing the expert as in claim 12 wherein the means for determining an availability further comprises means for detecting a current activity of a currently occupied expert of the ordered plurality of experts and for determining whether the current activity is a current activity that can be preempted, and means for terminating the current activity in favor of answering the question in response to determining that the current activity can be preempted.

20. The apparatus for providing the expert as in claim 19 wherein the detected activity further comprises the expert using a computer.

21. The apparatus for providing the expert as in claim 20 wherein the detected activity further comprises the expert using a telephone.

22. An apparatus for providing a human expert to answer a question from an agent interacting with a customer in real time comprising:
    an agent terminal that receives the question from the customer and permits the agent to submit the question to a search engine and receive information retrieved by the search engine based upon the question;
    a matching processor that, when activated by the agent in response to the agent determining that the information retrieved is not sufficient to answer the question, identifies in real-time a plurality of human experts best suited to answer the question based upon a subject matter of the question;
    a communication processor that determines an availability of at least some of the plurality of identified experts; and
    an expert selection processor that selects an expert of the plurality of experts to answer the question in real-time based upon the subject matter and availability of the selected expert.

23. The apparatus for providing the expert as in claim 22 further comprising a ranking entry for each of the plurality of experts that is used for ordering the plurality of experts from best relative match to worst relative match based upon the matching of the question with the keyword list of each expert of the plurality of experts.

24. The apparatus for providing the expert as in claim 22 further comprising an scheduling tool that is accessed by the communication processor to determine an availability of at least some experts of the plurality of experts.

25. The apparatus for providing the expert as in claim 22 further comprising a search processor that detects a current activity of a currently occupied expert of the ordered plurality of experts, and determines whether the current activity is preemptable and wherein the selection processor terminates the current activity in favor of answering the question if the current activity is determined to be preemptable.

26. The apparatus for providing the expert as in claim 25 wherein the detected activity further comprises the expert using a computer.

27. The apparatus for providing the expert as in claim 25 wherein the detected activity further comprises the expert using a telephone.

* * * * *

UNITED STATES PATENT AND TRADEMARK OFFICE
CERTIFICATE OF CORRECTION

| | | |
|---|---|---|
| PATENT NO. | : 7,523,082 B2 | |
| APPLICATION NO. | : 11/429774 | |
| DATED | : April 21, 2009 | |
| INVENTOR(S) | : Prabhuram Mohan | |

It is certified that error appears in the above-identified patent and that said Letters Patent is hereby corrected as shown below:

Title Page item 73 should read

Assignee: Aspect Software, Inc., Westford, Massachusetts

Signed and Sealed this
Twenty-ninth Day of March, 2011

David J. Kappos
*Director of the United States Patent and Trademark Office*